UNITED STATES PATENT OFFICE.

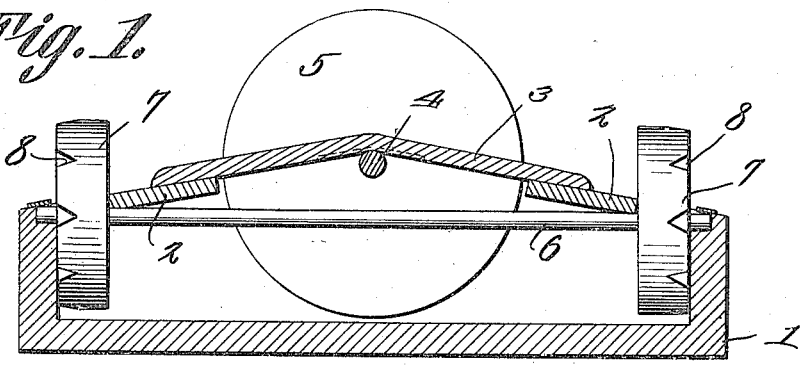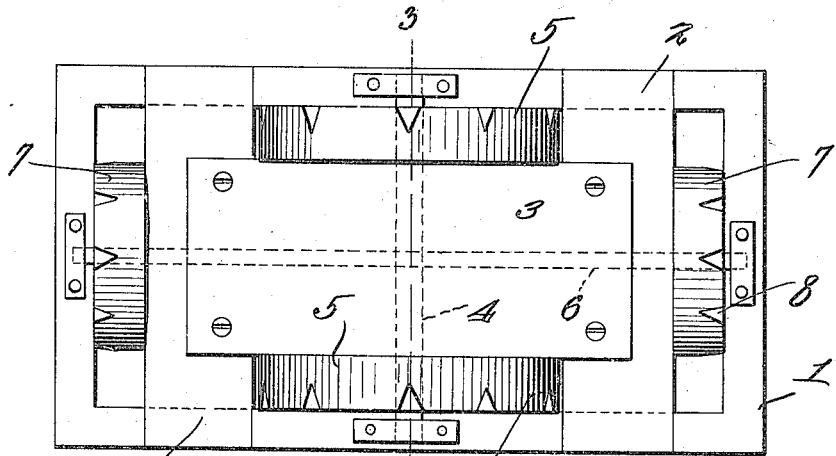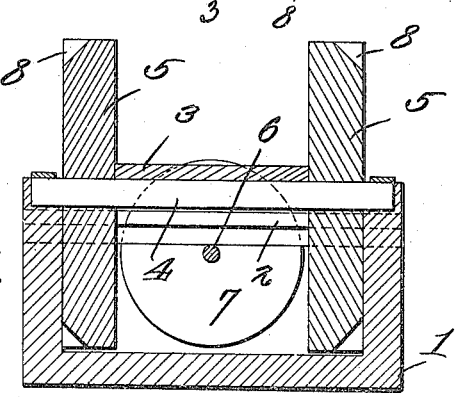

JAMES T. OXLEY, OF MAXWELL, IOWA.

HOG-OILER.

1,198,049.

Specification of Letters Patent. Patented Sept. 12, 1916.

Application filed June 3, 1916. Serial No. 101,556.

*To all whom it may concern:*

Be it known that I, JAMES T. OXLEY, a citizen of the United States, residing at Maxwell, in the county of Story and State of Iowa, have invented a new and useful Hog-Oiler, of which the following is a specification.

This invention relates to hog oilers, one of its objects being to provide a device of this character having oil conveyers over and against which the hogs may rub, the said conveyers operating to elevate oil from a receptacle so that it will be transferred to the animals rubbing thereagainst.

A further object is to provide a novel form of elevator designed to be saturated with the oil and which also has means for elevating portions of the oil and which oil, if not used, will be free to drain back into the receptacle provided therefor.

Another object is to provide a novel arrangement of rubbing devices which can be used both by large and small animals.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a vertical longitudinal section through the device. Fig. 2 is a plan view thereof. Fig. 3 is a vertical transverse section on the line 3—3 Fig. 2.

Referring to the figures by characters of reference 1 designates a shallow tank provided, near each end, with cross strips 2 mounted on the upper edges of the sides of the tank and which cross strips support a longitudinal top board or platform 3 inclined upwardly from its ends to its center, it being understood that the sides of the tank are extended upwardly so as to constitute bearings for a transverse shaft 4 which is arranged under and close to the highest portion of the platform 3. Interposed between the cross strips 2 and also between the sides of the tank and the side edges of the platform 3 are combined rubbers and elevating wheels 5 which are supported by the shaft 4. A longitudinal shaft 6 is arranged within the tank and mounted upon the end portions thereof are combined rubbers and elevating wheels 7 which are interposed between the end walls of the tank and the cross strips 2. All of the wheels are preferably formed of wood so that they will readily absorb the oil and each wheel is also preferably provided along the outer edge of its periphery with notches 8. The end wheels 7 are much smaller than the side wheels 5 but all of the wheels extend downwardly close to the bottom of the tank as shown in Fig. 1.

The tank is adapted to be partly filled with oil and is to be placed at a point where it can be conveniently reached by the animals. The animals will instinctively rub against the wheels and this will cause the wheels to rotate so that they will lift portions of the oil from the tank and apply the same to the skins of the animals. The animals will be able to rub against either the inner or the outer sides of the wheels, some of them often passing over the smaller wheels 7 and between the large wheels 5 so that all parts of the body will thus be oiled. The smaller wheels can also be used readily by the smaller animals. As the wheels are formed of absorbent material, they will always be in an oily condition and when any one of the wheels is rotated, portions of the oil in the tank will be carried upwardly within the notches 8 and the unused part of the elevated oil will drain back into the tank.

What is claimed is:—

1. The combination with a tank and a platform extending thereover, of oil elevating wheels mounted to rotate freely within the tank and extending thereabove past the platform, said platform being extended between the wheels, and smaller wheels interposed between the ends of the platform and the ends of the tank and projecting into and above said tank, said wheels being mounted to rotate freely.

2. The combination with a tank and a platform extending thereover, of oil elevating wheels mounted to rotate freely within the tank and extending thereabove past the platform, said platform being extended between the wheels, smaller wheels interposed between the ends of the platform and the ends of the tank and projecting into and above said tank, said wheels being mounted to rotate freely, all of the wheels being formed of an absorbent material and having peripheral depressions.

In testimony that I claim the foregoing as my own, I have hereto affixed my signature in the presence of two witnesses.

JAMES T. OXLEY.

Witnesses:
B. K. OLINGER,
W. A. OZMUN.

Copies of this patent may be obtained for five cents each, by addressing the "Commissioner of Patents, Washington, D. C."